(12) United States Patent
Gu et al.

(10) Patent No.: US 9,141,674 B2
(45) Date of Patent: Sep. 22, 2015

(54) PROMINENT DISPLAY OF SELECTIVE RESULTS OF BOOK SEARCH QUERIES

(71) Applicants: Xinxing Gu, Mountain View, CA (US); Xin Jiang, Mountain View, CA (US); Abraham Murray, Mountain View, CA (US); Piotr Zielinski, Mountain View, CA (US)

(72) Inventors: Xinxing Gu, Mountain View, CA (US); Xin Jiang, Mountain View, CA (US); Abraham Murray, Mountain View, CA (US); Piotr Zielinski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 192 days.

(21) Appl. No.: 13/828,775

(22) Filed: Mar. 14, 2013

(65) Prior Publication Data

US 2015/0169577 A1 Jun. 18, 2015

Related U.S. Application Data

(60) Provisional application No. 61/647,698, filed on May 16, 2012.

(51) Int. Cl.
*G06F 17/30* (2006.01)

(52) U.S. Cl.
CPC .................................. *G06F 17/3053* (2013.01)

(58) Field of Classification Search
USPC ........................... 707/706, 723, 728, 736, 749
See application file for complete search history.

(56) References Cited

U.S. PATENT DOCUMENTS

| | | | | |
|---|---|---|---|---|
| 6,785,671 B1 * | 8/2004 | Bailey et al. | | 705/26.81 |
| 7,251,647 B2 * | 7/2007 | Hoblit | | 707/609 |
| 7,287,214 B1 * | 10/2007 | Jenkins et al. | | 715/205 |
| 7,778,994 B2 * | 8/2010 | Raman et al. | | 707/706 |
| 7,836,391 B2 | 11/2010 | Tong | | |
| 7,979,457 B1 * | 7/2011 | Garman | | 707/768 |
| 8,060,489 B1 * | 11/2011 | Raman et al. | | 707/706 |
| 8,065,296 B1 * | 11/2011 | Franz et al. | | 707/723 |
| 8,095,546 B1 * | 1/2012 | Baluja et al. | | 707/750 |
| 8,166,062 B1 * | 4/2012 | McElroy | | 707/769 |
| 8,316,032 B1 * | 11/2012 | Baluja et al. | | 707/749 |
| 8,392,429 B1 * | 3/2013 | Clancy et al. | | 707/748 |
| 8,798,366 B1 * | 8/2014 | Jones et al. | | 382/177 |
| 2003/0195877 A1 * | 10/2003 | Ford et al. | | 707/3 |
| 2005/0091140 A1 * | 4/2005 | Sloan et al. | | 705/37 |
| 2006/0059134 A1 * | 3/2006 | Palmon et al. | | 707/3 |
| 2007/0067304 A1 * | 3/2007 | Ives | | 707/10 |
| 2007/0271153 A1 * | 11/2007 | Goel et al. | | 705/26 |
| 2010/0262495 A1 * | 10/2010 | Dumon et al. | | 705/14.54 |
| 2011/0078049 A1 * | 3/2011 | Rehman et al. | | 705/27.1 |
| 2011/0184941 A1 * | 7/2011 | El-Charif et al. | | 707/723 |
| 2011/0307411 A1 * | 12/2011 | Bolivar et al. | | 705/347 |
| 2012/0041846 A1 * | 2/2012 | Rehman et al. | | 705/27.1 |
| 2012/0179540 A1 * | 7/2012 | Michaels et al. | | 705/14.49 |
| 2013/0332479 A1 * | 12/2013 | Liu et al. | | 707/769 |
| 2014/0365498 A1 * | 12/2014 | Puntener et al. | | 707/741 |

* cited by examiner

*Primary Examiner* — Hanh Thai
(74) *Attorney, Agent, or Firm* — Harrity & Harrity, LLP

(57) ABSTRACT

A system is configured to receive a search query for books; identify a set of books that are relevant to the search query, where the set of books may be associated with relevance scores that represent a relevance of the set of books to the search query and that are based on book quality information that is independent of the search query; determine that a reference to a first book should be prominently presented in a search results document, that includes references to the set of books based on a relationship between a highest relevance score, associated with the first book, and a second highest relevance score associated with a second book; generate the search results document, which may be formatted to prominently present the reference to the first book in relation to the references to one or more of the set of books; and transmit the search results document.

23 Claims, 11 Drawing Sheets

Fig. 10

PROMINENT DISPLAY OF SELECTIVE RESULTS OF BOOK SEARCH QUERIES

RELATED APPLICATION

This application is a non-provisional of U.S. Provisional Application No. 61/647,698, filed May 16, 2012, the contents of which have been incorporated herein by reference.

BACKGROUND

Many techniques are available to users today to find information on the world wide web ("web"). For example, users often use web browsers and/or search engines to find information of interest.

One type of search includes a search for books. A book search may be performed in association with an online book store, where a user enters a search query that includes, for instance, the title, author, or other descriptive information relating to a book. In response, information relating to a number of books, relevant to the search query, may be displayed to the user.

SUMMARY

In some possible implementations, a method, performed by one or more server devices, may include receiving, from a client, a search query associated with a search for books associated with a book repository; identifying a set of books that are relevant to the search query, where the set of books may be associated with relevance scores that represent a relevance of the set of books to the search query and that are based on book quality information that is independent of the search query; determining that a reference to a first book, of the set of books, should be prominently presented in a search results document, that includes references to the set of books, provided to the client, based on a relationship between a highest one of the relevance scores, associated with the first book and a second highest one of the relevance scores associated with a second book of the set of books; generating a search results document, where the search results document may be formatted to prominently present the reference to the first book in relation to the references to the set of books when the determination indicates that the reference to the first book should be prominently present in the search results document provided to the client; and transmitting the search results document to the client.

In some possible implementations, determining that the reference to the first book should be prominently presented may include determining to prominently present the reference to the first book in the search results document provided to the client when a ratio, of the highest one of the relevance scores and the second highest one of the relevance scores, is greater than a particular threshold value.

In some possible implementations, determining that the reference to the first book should be prominently presented may include determining to prominently present the reference to the first book in the search results document provided to the client when the highest one of the relevance scores is greater than the second highest one of the relevance scores by a particular threshold.

In some possible implementations, generating the search results document may include formatting the search results document to present the references to the set of books in a grid structure, in which a first row of the grid structure presents the reference to the first book and a second row of the grid structure presents a reference to the second book and references to one or more additional books from the set of books.

In some possible implementations, the first row of the grid structure may include a link to purchase the first book, where selection of the link may initiate a purchase of the first book.

In some possible implementations, the set of books may include books that are available, for download or purchase, by the client, and where the method may further include identifying at least one other book, from a set of books that are not available for download or purchase by the client, that is relevant to the search query, where the at least one other book may be associated with a relevance score that represents a relevance of the at least one other book to the search query; and comparing the relevance score, associated with the first book, with the relevance score of the at least one other book to determine whether to include a reference to the at least one other book in the search results document provided to the client; and where generating the search results document may include generating the search results document to prominently present the reference to the at least one other book when a result of the comparison, of the relevance score of the first book with the relevance score of the at least one other book, indicates that the reference to the at least one other book is to be included in the search results document provided to the client.

In some possible implementations, generating the search results document to prominently present the reference to the at least one other book may include including a message, indicating that at least one other book is not available for download or purchase, in the search results document.

In some possible implementations, the relevance scores, associated with the set of books, may be based on one or more of: whether the set of books are published by a particular set of publishing companies; whether the set of books are on best selling lists; whether the set of books are written by a particular set of authors; or whether the set of books have sales volumes greater than a threshold.

In some possible implementations, the set of books may include printed books, electronic books, magazines, electronic magazines, or newspapers.

In some possible implementations, generating the search results document may include generating the search results document to include more information in the reference to the first book than in the references to the one or more of the set of books.

In some possible implementations, a computer-readable medium may store instructions that may include a set of instructions that, when executed by at least one processor, cause the at least one processor to: receive, from a client, a search query for books; identify a set of books that are relevant to the search query, where the set of books may be associated with relevance scores that represent a relevance of the set of books to the search query and that are based on book quality information that is independent of the search query; determine that a reference to a first book, of the set of books, should be prominently presented in a search results document, that includes references to the set of books, provided to the client, based on a relationship between a highest one of the relevance scores, associated with the first book, and a second highest one of the relevance scores associated with a second book of the set of books; generate the search results document, where the search results document may be formatted to prominently present the reference to the first book in relation to the references to one or more of the set of books when the determination indicates that the reference to the first book should be prominently presented in the search results document provided to the client; and transmit the search results document to the client.

In some possible implementations, the instructions may further include one or more instructions to determine to prominently present the reference to the first book in the search results document provided to the client when a ratio, of the highest one of the relevance scores and the second highest one of the relevance scores, is greater than a particular threshold value.

In some possible implementations, the instructions may further include one or more instructions to determine to prominently present the reference to the first book in the generated search results document provided to the client when the highest one of the relevance scores is greater than the second highest one of the relevance scores by a particular threshold.

In some possible implementations, the set of books may include books that are available, for download or purchase by the client, and the instructions may further include one or more instructions to: identify at least one other book, from a set of books that are not available for download or purchase by the client, that is relevant to the search query, where the at least one other book may be associated with a relevance score that represents a relevance of the at least one other book to the search query; and compare the highest one of the relevance scores, associated with the first book, with the relevance score of the at least one other book to determine whether to include a reference to the at least one other book in the search results document provided to the client; and where one or more instructions, of the set of instructions, to generate the search results document may include one or more instructions to generate the search results document to prominently present the at least one other book when a result of the comparison, of the highest one of the relevance scores with the relevance score of the at least one other book, indicates that the reference to the at least one other book is to be included in the search results document provided to the client.

In some possible implementations, a method, performed by one or more server devices, may include receiving, from a client, a search query associated with a search for books; identifying a group of books that are relevant to the search query, where the group of books may be associated with relevance scores that represent a relevance of the group of books to the search query, and the group of books may include books that are available for download or purchase by the client; identifying at least one other book, from a set of books that are not available for download or purchase by the client, where the at least one other book may be associated with a relevance score that represents a relevance of the at least one other book to the search query; determining whether to prominently present a reference to the at least one other book in a search results document provided to the client based on a relationship between a highest one of the relevance scores, associated with a first book of the group of books, and the relevance score of the at least one other book, where the search results document may additionally include references to the group of books; generating the search results document, where the search results document may be formatted to prominently present the reference to the at least one other book relative to the references to one or more of the group of books, when the determination indicates that the at least one other book should be prominently presented in the search results document provided to the client; and transmitting the search results document to the client.

In some possible implementations, generating the search results document may include providing, in connection with the prominent presentation of the reference to the at least one other book within the search results document, a message indicating that the at least one other book is not available for download.

In some possible implementations, the method may further include comparing the relevance score of the first book with a relevance score of a second book, associated with a second highest one of the relevance scores of the group of books; and generating the search results document to prominently present a reference to the first book in relation to references to other ones of the set of books, when a result of the comparison indicates that the relevance of the first book is greater than the relevance of the second book, by at least a threshold, and when the determination indicates that the at least one other book should not be prominently presented in the search results document provided to the client.

In some possible implementations, generating the search results document to prominently present a reference to the first book may include formatting the search results document to present references to the group of books in a grid structure, in which a first row of the grid structure presents the reference to the first book and a second row of the grid structure presents a reference to the second book and references to one or more additional books from the group of books.

In some possible implementations, the first row of the grid structure may include a link to purchase the first book, where selection of the link may initiate a purchase of the first book.

In some possible implementations, a computer-readable medium may store instructions that may include a set of instructions that, when executed by at least one processor, cause the at least one processor to: receive, from a client, a search query for books; identify a group of books that are relevant to the search query, where the group of books may be associated with relevance scores that represent a relevance of the group of books to the search query, and the group of books may include books that are available for download or purchase by the client; identify at least one other book, from a set of books that are not available for download or purchase by the client, where the at least one other book may be associated with a relevance score that represents a relevance of the at least one other book to the search query; determine whether to prominently present a reference to the at least one other book in a search results document provided to the client based on a relationship between a highest one of the relevance scores, associated with a first book of the group of books, and the relevance score of the at least one other book, where the search results document may additionally include references to the group of books; generate the search results document, where the search results document may be formatted to prominently present the reference to the at least one other book, relative to one or more of the group of books, when the determination indicates that the at least one other book should be prominently presented in the search results document provided to the client; and transmit the search results document to the client.

In some possible implementations, the instructions may include one or more instructions to provide, in connection with the prominent presentation of the reference to the at least one other book within the search results document, a message indicating that the at least one other book is not available for download or purchase.

In some possible implementations, the instructions may further include one or more instructions to: compare the relevance score of the first book with a relevance score of a second book, associated with a second highest one of the relevance scores of the group of books; and generate the search results document to prominently present a reference to the first book in relation to references to other ones of the group of books, when a result of the comparing of the relevance score of the first book indicates that the relevance score of the first book is greater than the relevance score of the second book, by at least a threshold, and when the determination indicates that the at least one other book should not be prominently presented in the search results document provided to the client.

In some possible implementations, one or more instructions, in the set of instructions, to generate the search results document to prominently present a reference to the first book, may include one or more instructions to format the search results document to present references to the group of books in a grid structure, in which a first row of the grid structure presents the reference to the first book and a second row of the grid structure presents a reference to the second book and references to one or more additional books from the group of books.

In some possible implementations, a system may include means for receiving, from a client, a search query associated with a search for books associated with a book repository; means for identifying a set of books that are relevant to the search query, where the set of books may be associated with relevance scores that represent a relevance of the set of books to the search query and that are based on book quality information that is independent of the search query; means for determining that a reference to a first book, of the set of books, should be prominently presented in a search results document, that includes references to the set of books, provided to the client, based on a relationship between a highest one of the relevance scores, associated with the first book and a second highest one of the relevance scores associated with a second book of the set of books; means for generating a search results document, where the search results document may be formatted to prominently present the reference to the first book in relation to the references to the set of books when the determination indicates that the reference to the first book should be prominently present in the search results document provided to the client; and means for transmitting the search results document to the client.

In some possible implementations, a system may include means for receiving, from a client, a search query associated with a search for books; means for identifying a group of books that are relevant to the search query, where the group of books may be associated with relevance scores that represent a relevance of the group of books to the search query, and the group of books may include books that are available for download or purchase by the client; means for identifying at least one other book, from a set of books that are not available for download or purchase by the client, where the at least one other book may be associated with a relevance score that represents a relevance of the at least one other book to the search query; means for determining whether to prominently present a reference to the at least one other book in a search results document provided to the client based on a relationship between a highest one of the relevance scores, associated with a first book of the group of books, and the relevance score of the at least one other book, where the search results document may additionally include references to the group of books; means for generating the search results document, where the search results document may be formatted to prominently present the reference to the at least one other book relative to the references to one or more of the group of books, when the determination indicates that the at least one other book should be prominently presented in the search results document provided to the client; and means for transmitting the search results document to the client.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 10 is a diagram illustrating an example search results document that may present the results of a book search query.

DETAILED DESCRIPTION

The following detailed description refers to the accompanying drawings. The same reference numbers in different drawings may identify the same or similar elements.

A book search, such as a search query submitted to an online book store or search engine, may include one or more terms describing a particular book, author, or topic desired by a user. In response, a book search engine may return one or more search results, such as search results displayed in a grid structure or list, to the user.

Some book search queries may be specific enough that the book search engine can determine, with a particular degree of certainty, that a particular book is being sought by the user. In some implementations described herein, a book search engine may determine when a book search query is one in which a particular book is likely, with a particular degree of certainty, to be the intended result of the search query. In this case, information relating to the particular book may be prominently presented, to the user, relative to other books.

Figure 1:
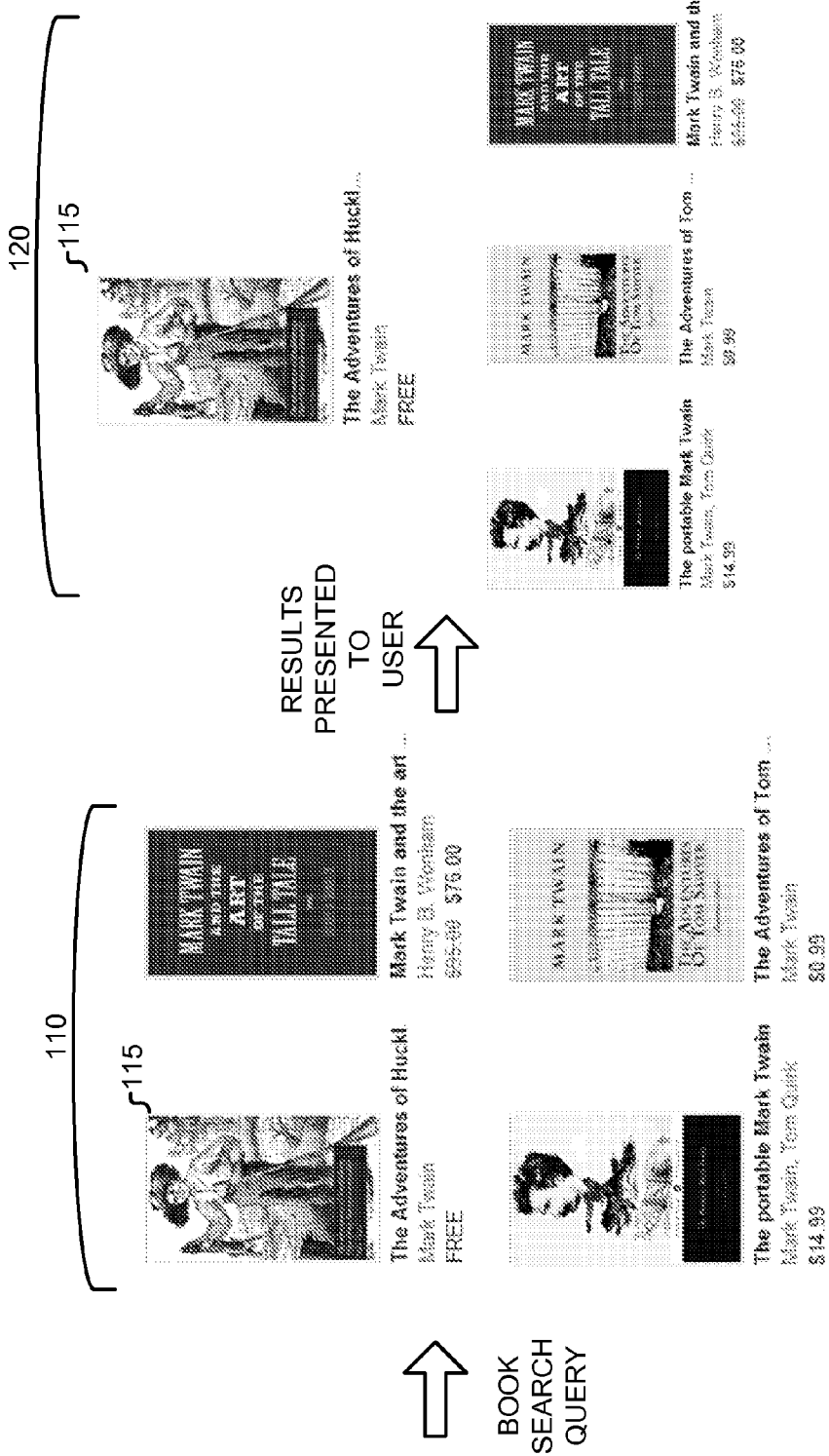
FIG. 1 is a diagram illustrating an example of a book search.

FIG. 1 is a diagram illustrating an example of a book search. Assume that a user, visiting an online book store, enters the search query "adventures of huckleberry finn" into a search box provided by the online book store. A book search engine may identify a number of books 110 (i.e., the search results for the search query) that are relevant to the search query. One of books 110 may be identified, by the search engine, as being a book that is likely to be the particular book for which the user is searching. For this example, book 115, "The Adventures Of Huckleberry Finn," by Mark Twain, may be the particular book being sought by the user. When presenting books 110 to the user, references to books 110, potentially including descriptive information or images relating to books 110, may be presented such that book 115 is prominently displayed relative to other ones of books 110. As shown in the example of FIG. 1, for search results 120, a description for book 115 is shown larger than the description for the other ones of books 110, and the description for book 115 is shown in its own row of a grid display while the descriptions for the other ones of books 110 are grouped as multiple books in a single row of the grid display. In this manner, the user may be able to quickly and easily identify the book for which the user is searching.

The concepts, described herein, will be described in the context of books and a book search engine. The term "book" may be broadly construed to cover a traditional printed book, an electronic book (ebook), a magazine, an electronic magazine, a newspaper, or other readable media that may be sold or downloaded from a book store, online book store, or book search engine. A "link," as the term is used herein, is to be broadly interpreted to include any reference to a document from another document or another part of the same document.

In the description herein, a device may be described as performing operations with respect to a book or a set of books. This description may be broadly interpreted to include the device performing operations with respect to a reference to a book, an identifier associated with the book, or a set of references to books or a set of identifiers associated with the books. For example, although a search component may be described as identifying and/or processing books, the search component may, in practice, identify/process links or references to the books.

Figure 2:
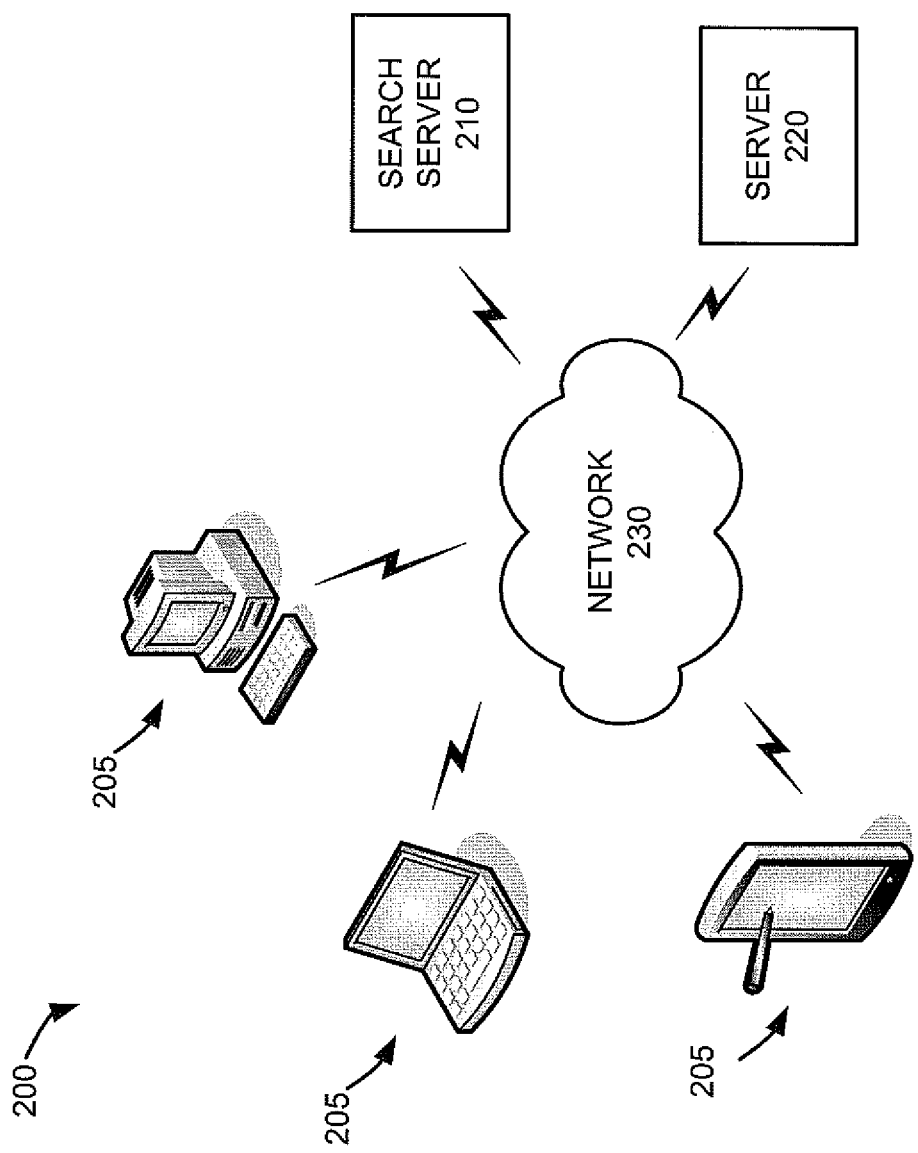
FIG. 2 is a diagram of an example environment in which systems and methods, described herein, may be implemented.

FIG. 2 is a diagram of an example environment 200 in which systems and methods, described herein, may be implemented. Environment 200 may include multiple clients 205 connected to one or more servers 210 and 220 via a network 230. In some implementations, and as illustrated, server 210 may be a search server, such as a server that implements a book search engine. Server 220 may be, for example, a web server that implements an online book store or book repository, or another type of server. Clients 205 and servers 210 and 220 may connect to network 230 via wired connections, wireless connections, or a combination of wired and wireless connections.

Three clients 205 and two servers 210 and 220 are illustrated as connected to network 230 for simplicity. In practice, there may be additional or fewer clients and servers. Also, in some instances, a client may perform one or more functions of a server and a server may perform one or more functions of a client.

Clients 205 may include devices of users that access servers 210 and/or 220. A client 205 may include, for instance, a personal computer, a wireless telephone, a personal digital assistant (PDA), a laptop, a smart phone, a tablet computer, or another type of computation or communication device.

Servers 210 and 220 may include devices that access, fetch, aggregate, process, search, provide, and/or maintain documents. Although shown as single components 210 and 220 in FIG. 2, each server 210 and 220 may, in some implementations, be implemented as multiple computing devices, which may potentially be geographically distributed.

Search server 210 may include one or more computing devices designed to implement a search engine, such as a book search engine. Search server 210 may, for example, include one or more web servers to receive search queries from clients 205, search one or more indexes in response to the search queries, and return documents, relevant to the search queries, to clients 205. In some implementations, an interface for search server 210 may be provided by another server, such as server 220, which may then query search server 210. For example, server 220 may be an online book store that receives search queries for books. Server 220 may transmit the queries to search server 210 for fulfillment and may then forward the results of a book search to clients 205.

Server 220 may include one or more computing devices designed to provide server-related functions. As mentioned, in some implementations, server 220 may implement a book store, such as an electronic book store, or a book search engine.

While servers 210 and 220 are shown as separate entities, it may be possible for server 210 or 220 to perform one or more of the functions of the other one of server 210 or 220. For example, it may be possible that servers 210 and 220 are implemented as a single server. It may also be possible for a single one of server 210 or 220 to be implemented as two or more separate (and possibly distributed) devices.

Network 230 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks.

Although FIG. 2 shows example components of environment 200, in other implementations, environment 200 may contain fewer devices, different devices, differently arranged devices, or additional devices than those depicted in FIG. 2. Alternatively, or additionally, one or more devices of environment 200 may perform one or more tasks described as being performed by one or more other devices of environment 200.

Figure 3:
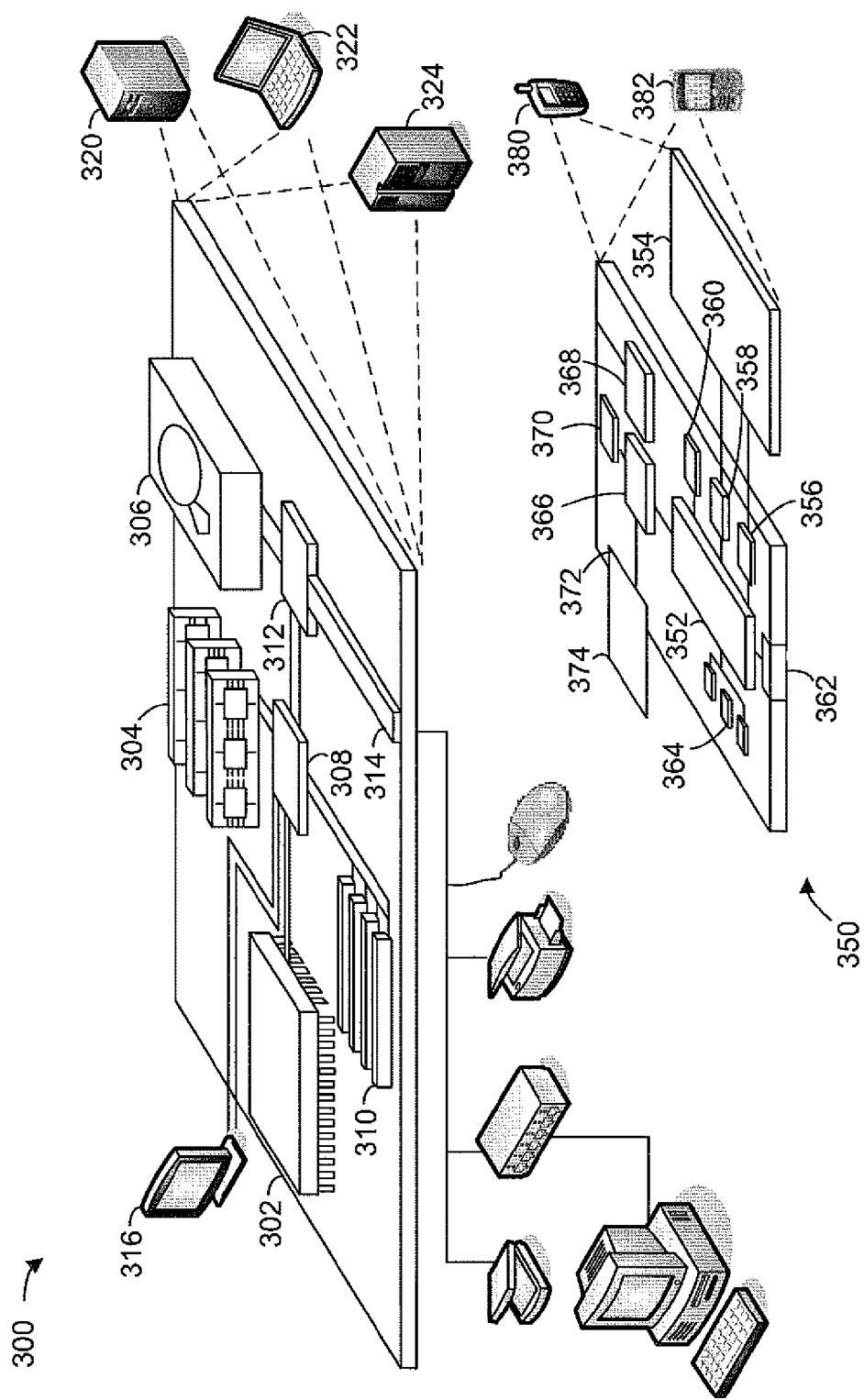
FIG. 3 shows an example of a generic computing device and a generic mobile computing device.

FIG. 3 shows an example of a generic computing device 300 and a generic mobile computing device 350, which may be used with the techniques described herein. Computing device 300 may correspond to, for example, client 205 and/or server 210 and/or 220. For example, each of clients 205 and servers 210 and/or 220 may include one or more computing devices 300. Mobile computing device 350 may correspond to, for example, portable implementations of clients 205.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, may be interconnected using various busses, and may be mounted on a common motherboard or in other manners as appropriate. Processor 302 may process instructions for execution within computing device 300, including instructions stored in the memory 304 or on storage device 306 to display graphical information for a graphical user interface (GUI) on an external input/output device, such as display 316 coupled to high speed interface 308. In some implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 may store information within computing device 300. In some implementations, memory 304 may include a volatile memory unit or units. In some implementations, memory 304 may include a non-volatile memory unit or units. Memory 304 may also be another form of computer-readable medium, such as a magnetic or optical disk. A computer-readable medium may be defined as a non-transitory memory device. A memory device may include memory space within a single physical memory device or memory space spread across multiple physical memory devices.

Storage device 306 may provide mass storage for computing device 300. In some implementations, storage device 306 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 304, storage device 306, or memory included within processor 302.

High speed controller 308 may manage bandwidth-intensive operations for computing device 300, while low speed controller 312 may manage lower bandwidth-intensive operations. Such allocation of functions is an example only. In some implementations, high-speed controller 308 may be coupled to memory 304, display 316, e.g., through a graphics processor or accelerator, and to high-speed expansion ports 310, which may accept various expansion cards. In some implementations, low-speed controller 312 may be coupled to storage device 306 and to low-speed expansion port 314. Low-speed expansion port 314, which may include various communication ports, e.g., USB, Bluetooth, Ethernet, wireless Ethernet, may be coupled to one or more input/output devices, such as a keyboard, a pointing device, a scanner, or a networking device, such as a switch or router, e.g., through a network adapter.

Computing device 300 may be implemented in a number of different forms, as shown in FIG. 3. For example, it may be implemented as a standard server 320, or multiple times in a group of such servers. It may also be implemented as part of a rack server system 324. Additionally or alternatively, computing device 300 may be implemented in a personal computer, such as a laptop computer 322. Additionally or alternatively, components from computing device 300 may be combined with other components in a mobile device, such as mobile computing device 350. Each of such devices may contain one or more of computing device 300, mobile computing device 350, and/or an entire system may be made up of multiple computing devices 300 and/or mobile computing devices 350 communicating with each other.

Mobile computing device 350 may include a processor 352, a memory 364, an input/output (I/O) device such as a display 354, a communication interface 366, and a transceiver 368, among other components. Mobile computing device 350 may also be provided with a storage device, such as a microdrive or other device (not shown), to provide additional storage. Each of components 350, 352, 364, 354, 366, and 368, may be interconnected using various buses, and several of the components may be mounted on a common motherboard or in other manners as appropriate.

Processor 352 may execute instructions within mobile computing device 350, including instructions stored in memory 364. Processor 352 may be implemented as a set of chips that may include separate and multiple analog and/or digital processors. Processor 352 may provide, for example, for coordination of the other components of mobile computing device 350, such as, for example, control of user interfaces, applications run by mobile computing device 350, and/or wireless communication by mobile computing device 350.

Processor 352 may communicate with a user through control interface 358 and a display interface 356 coupled to a display 354. Display 354 may include, for example, a Thin-Film-Transistor Liquid Crystal Display (TFT LCD), an Organic Light Emitting Diode (OLED) display, and/or other appropriate display technology. Display interface 356 may comprise appropriate circuitry for driving display 354 to present graphical and other information to a user. Control interface 358 may receive commands from a user and convert them for submission to processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 may store information within mobile computing device 350. Memory 364 can be implemented as one or more of a computer-readable medium or media, a volatile memory unit or units, or a non-volatile memory unit or units. Expansion memory 374 may also be provided and connected to mobile communication device 350 through expansion interface 372, which may include, for example, a Single In Line Memory Module (SIMM) card interface. Such expansion memory 374 may provide extra storage space for mobile computing device 350, or may also store applications or other information for mobile computing device 350. Specifically, expansion memory 374 may include instructions to carry out or supplement the processes described above, and may also include secure information. Thus, for example, expansion memory 374 may be provided as a security module for mobile computing device 350, and may be programmed with instructions that permit secure use of mobile computing device 350. In addition, secure applications may be provided via SIMM cards, along with additional information, such as placing identifying information on a SIMM card in a non-hackable manner.

Memory 364 and/or expansion memory 374 may include, for example, flash memory and/or NVRAM memory, as discussed below. In some implementations, a computer program product may be tangibly embodied in an information carrier. The computer program product may store instructions that, when executed, perform one or more methods, such as those described above. The information carrier may correspond to a computer- or machine-readable medium, such as the memory 364, expansion memory 374, or memory included within processor 352, that may be received, for example, over transceiver 368 or over external interface 362.

Mobile computing device 350 may communicate wirelessly through a communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, a Global Positioning System (GPS) receiver module 370 may provide additional navigation- and location-related wireless data to mobile computing device 350, which may be used as appropriate by applications running on mobile computing device 350.

Mobile computing device 350 may also communicate audibly using an audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in FIG. 3. For example, it may be implemented as a cellular telephone 380. It may also be implemented as part of a smart phone 382, a personal digital assistant, and/or other similar mobile device.

Various implementations of the systems and techniques described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs—also known as programs, software, software applications or code—may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The systems and techniques described herein may be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system may be interconnected by any form or medium of digital data communication, e.g., a communication network. Examples of communication networks include a local area network ("LAN"), a wide area network ("WAN"), and the Internet.

Although FIG. 3 shows example components of computing device 300 and mobile computing device 350, computing device 300 or mobile computing device 350 may include fewer components, different components, additional components, or differently arranged components than depicted in FIG. 3. Additionally or alternatively, one or more components of computing device 300 or mobile computing device 350 may perform one or more tasks described as being performed by one or more other components of computing device 300 or mobile computing device 350.

Figure 4:
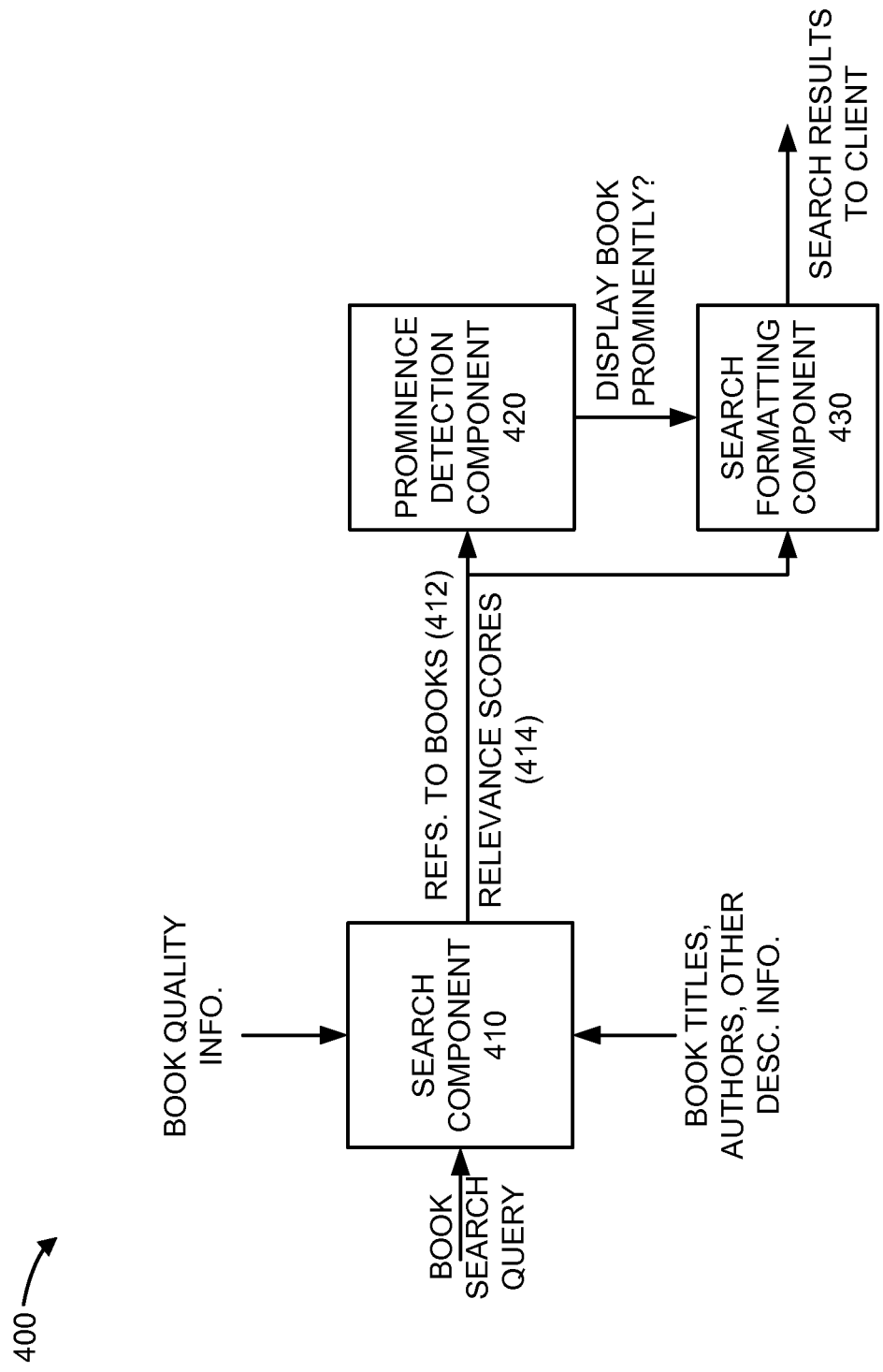
FIG. 4 is a diagram of example functional components relating to prominence detection and presentation of search results.

FIG. 4 is a diagram of example functional components 400 relating to prominence detection and presentation of search results. Functional components 400 may be implemented by a server, such as search server 210. In general, functional components 400 may determine whether a search query is a search query for which one or more results should be prominently presented, and, when the search query is one for which results should be prominently presented, format a document to prominently present one or more of the results relative to other ones of the results.

As shown in FIG. 4, functional components 400 may include a search component 410, a prominence detection component 420, and a search formatting component 430.

Search component 410 may receive a search query from a client 205. In some implementations, the search query may be a query for a book. Search component 410 may use the search query to identify a set of references to books relevant to the search query. For example, search component 410 may analyze search terms, of the search query, against terms in an index to identify books, or references to books (412), that include or are associated with those search terms. For each identified book, search component 410 may generate a relevance score (414), which reflects a measure of relevance of the identified book to the search query. Many different techniques exist for determining the relevance score of a document (e.g., a book or descriptive information corresponding to a book) to a search query, such as a matching of terms of the search query to the content of the document. Another possible factor that may be used in determining relevance scores may include geographic information. For example, a particular book may be particularly relevant to, or have a high sales volume in, a particular geographic region. In this case, the relevance score of the book may be increased if the client that submitted the search query is from the particular geographic region.

The index or relevance determining technique used by search component 410 may be derived from or based on a number of sources of information. For example, information relating to books, such as book titles, the authors of books, descriptive information relating to the books (e.g., a synopsis of the book), genre or other category information, or other information relating to books, may be used by search component 410 to match book search queries to relevant books.

Search component 410 may additionally use book quality information, which is independent of a search query, as part of the relevance score. Book quality information may include, for example, a value or values relating to the authoritativeness or legitimacy of books, and may be referred to as a quality score for a book. As described above, the quality score for a book may be determined independently of the relevance of the book to a particular search query. In some implementations, the quality score, for a book, may be used as a factor in determining the final relevance score, for the book, to the search query. In some implementations, books published by large or well-known publishing companies may be deemed to have higher book quality scores than books published by lesser-known publishing companies. As another example, in some implementations, books that are on best selling lists, books that are associated with reviews by known reviewers, books that are written by prolific or well known authors, or books that have had high sales may be given a higher quality score relative to books that are not on best selling lists, that are not associated with reviews by known reviewers, that are written by lesser known authors, or that have lower sales volumes, respectively. In some implementations, other factors may additionally, or alternatively, be used to determine the quality scores. For example, the sales data, or other data for a book, may be filtered based on a time window. For instance, older sales data may be deemphasized relative to newer sales data, the sales data may only be used over a particular time period, such as an X-year window (X≥1), etc. As another example of other factors that may additionally, or alternatively, be used to determine the quality scores, library holding or circulation information may be used to determine the quality scores, where books that are more commonly available in libraries may be assigned a higher quality score than books that are less commonly available. As another example, the publication date or the number of published editions of a book may be used as a factor in determining the quality score of the book.

Some books may include multiple published editions of the book. In some implementations, the quality score for the book, such as the most recent edition of the book, may take into account, or may be based on an aggregation of, the quality scores corresponding to multiple editions of the book. In some possible implementations, the quality score for a book may be determined on a per-edition basis. Thus, the quality score for a book may be processed based on a per-edition or per-title basis.

In some implementations, other factors than those given above may be used to determine the quality scores. For example, information relating to book accesses may be used. The book access information may include information regarding the number of times that a book is accessed or selected from a set of search results and/or the amount of time that users spend accessing the book. For example, books that were accessed or browsed more often or that users spent more time accessing may be given a higher quality score than books that were accessed less often or that users spent less time accessing. Another possible factor may include link-based scores of related books or documents. A related document may include an associated publishers' web page or web site. For example, the publisher or author associated with a book may be identified and a web page or web site (or set of web pages or web sites) associated with the publisher/author may be located. The link-based score of the web page(s) or web site(s) associated with the publisher/author may then be used to influence the quality score of the book. Several techniques exist for determining the link-based score of a web page or web site.

Prominence detection component 420 may receive the references to the books 412 and the corresponding relevance scores 414 determined by search component 410. Based on this information, prominence detection component 420 may determine whether one or more of the books, corresponding to the references to books 412, should be prominently presented in search results provided to client 205. A number of techniques may be used by prominence detection component 420 in determining whether to prominently present a particular book.

In some implementations, prominence detection component 420 may identify the most relevant book (i.e., the book associated with the highest relevance score of relevance scores 414) and the second most relevant book (i.e., the book associated with the second highest relevance score of relevance scores 414). These two relevance scores may be compared and the most relevant book may be identified for prominent display when the relevance score of the most relevant book is significantly greater than the relevance score of the second most relevant book. For example, the ratio of the relevance scores of the first most relevant book and the second most relevant book may be calculated, and a determination to prominently display the first most relevant book may be made when the ratio is greater than a particular threshold (e.g., 10). The particular threshold may be determined through, for example, empirical observation of a number of example search queries. In some possible implementations, instead of calculating the ratio between the relevance scores of the first and second most relevant books, the difference between the relevance scores of the first and second most relevant books may be calculated. The determination of whether to prominently display the first most relevant book may then be made when the difference is greater than a particular threshold. Other techniques could alternatively be used to make the determination of whether to prominently display the first most relevant book. In general, the determination of whether to prominently display the first most relevant book may be based on the goal of determining whether the user has submitted a query that targets a specific book.

Search formatting component 430 may receive the references to the relevant books 412 and relevance scores 414. Search formatting component 430 may also receive an indication of whether prominence detection component 420 determined that one or more of the books should be prominently displayed. Search formatting component 430 may generate a search results document, such as a hyper-text markup language (HTML) document, that includes the results of the book search query. The search results document may be formatted differently based on whether a book was determined to be presented prominently. For instance, the first most relevant book may be prominently presented by increasing the visual area (relative to the visual area when no book is to be prominently presented) devoted to the first most relevant book and/or by including one or more messages in the visual area devoted to the first most relevant book.

Although FIG. 4 shows an example of functional components 400, in other implementations, functional components 400 may contain fewer components, different components, differently arranged components, or additional components than those depicted in FIG. 4. Alternatively, or additionally, one or more functional components 400 may perform one or more other tasks described as being performed by one or more other functional components 400.

Figure 5:
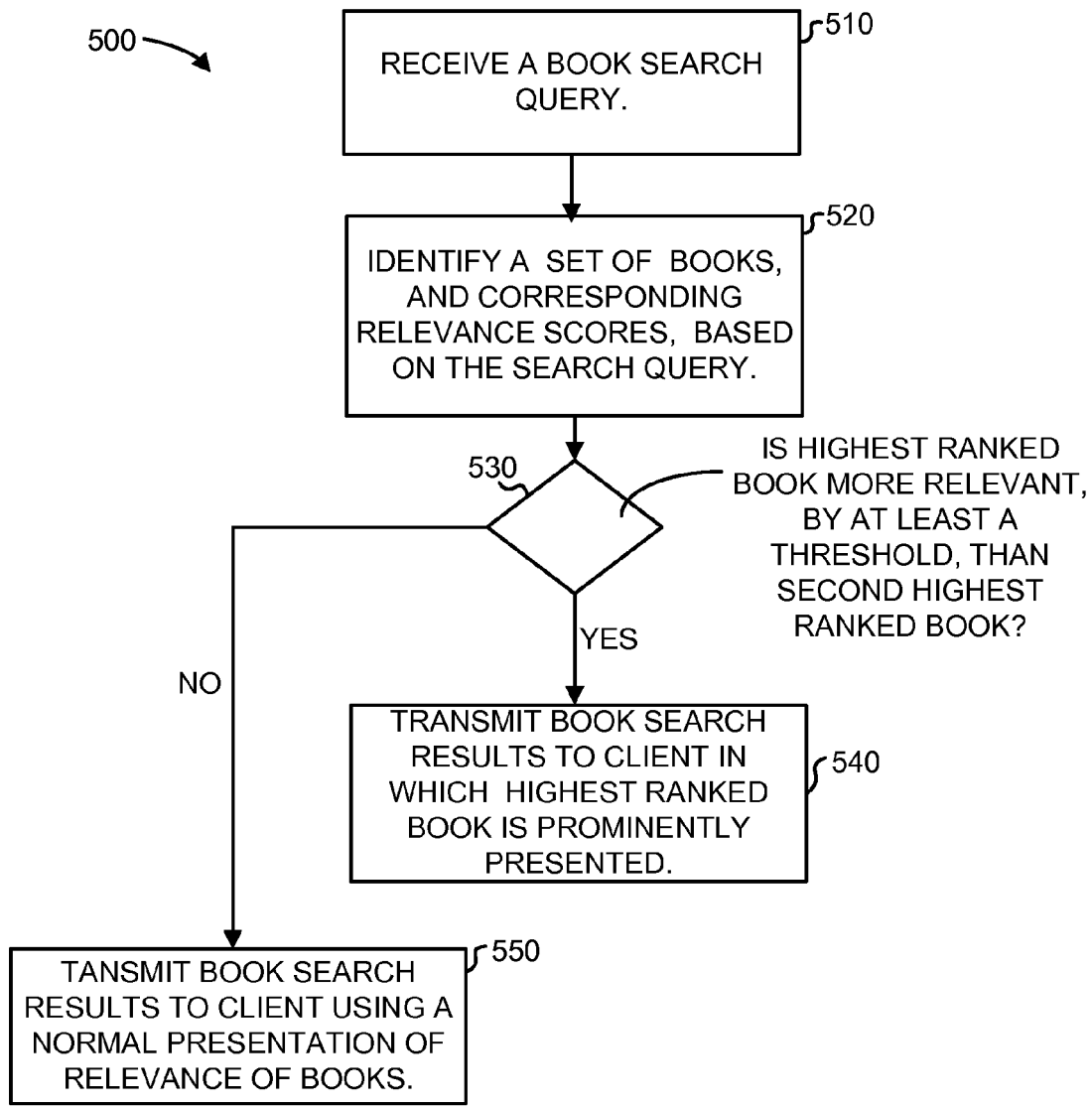
FIG. 5 is a flow chart of an example process for prominently displaying selected results of book search queries.

FIG. 5 is a flow chart of an example process 500 for prominently presenting selected results of book search queries. Process 500 may be performed by, for example, search server 210.

Process 500 may include receiving a book search query (block 510). For example, a user of a client 205 may desire to search for a book while accessing, browsing, or visiting a book store, such as an online book store implemented by server 220. In the discussion herein, a book search query received directly from a client 205 and a book search query received from server 220, on behalf of client 205, will be equivalently discussed as a book search query received from a client 205.

Process 500 may further include identifying a set of books (or references to books), relevant to the search query (block 520). Relevance scores corresponding to the set of books may also be identified (block 520). For instance, search component 410 may calculate, or otherwise determine, based on the search query, relevance scores associated with a number of books. Search component 410 may then identify a set of references to a certain quantity of relevant books (e.g., references to the 100 books most relevant to the search query).

Process 500 may further include determining whether the highest ranked book is more relevant, by at least a threshold value, than the second highest ranked book (block 530). As previously discussed, this determination may be made by prominence detection component 420 and may be based on a comparison of the ratio, or the difference, of the relevance scores of the first and second highest ranking book, to a threshold value.

When the highest ranked book is determined to be more relevant, by at least a threshold, than the next highest ranked book (block 530—YES), process 500 may include transmitting search results, to client 205, in which descriptive information for the highest ranked book is prominently presented relative to descriptive information for other books in a search results document that conveys the search results (block 540). A number of techniques can be used to prominently present the descriptive information for the highest ranked book. For instance, an image representing the book may be enlarged relative to images representing the other books, the location of the descriptive information for the highest ranked book may be set apart from the descriptive information for other books, a different color or font may be used in the description of the book relative to the other books, a custom message may be presented, an animation may be associated with the highest ranked book, etc.

Figure 6:
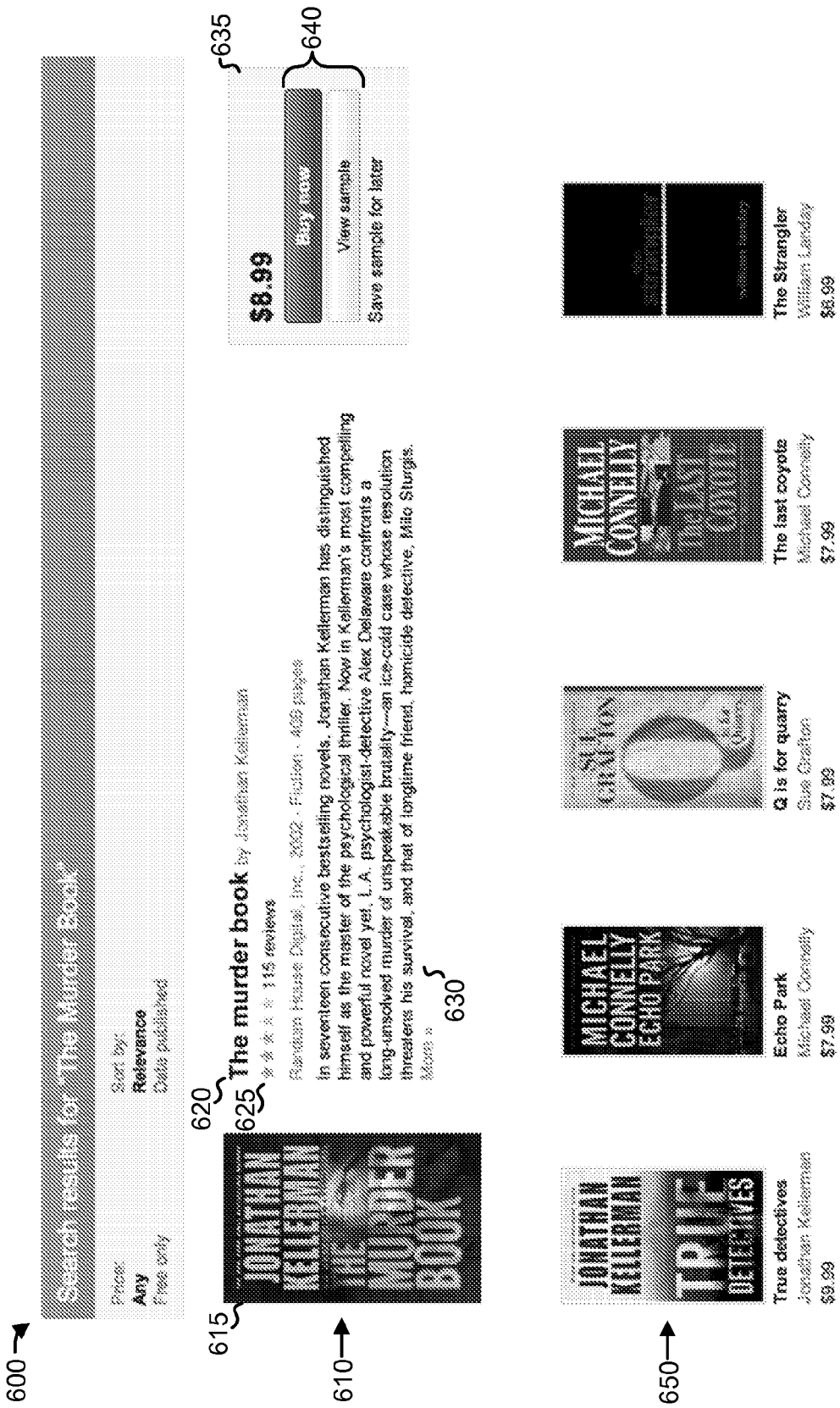
FIGS. 6 and 7 are diagrams illustrating example search results documents that may present the results of a book search query.

FIG. 6 is a diagram illustrating an example search results document 600 that may present the results of a book search query, such as book search results transmitted in block 540. In this example, assume that the search query is the query "The Murder Book," and that prominence detection component 420 determines that the book "The Murder Book," by Jonathan Kellerman, is the most relevant book and furthermore, that this book is likely to be the particular book being sought by the user (i.e., it is determined to be the highest ranked book and should be prominently presented).

As shown, search results document 600 may present the book search results in a grid structure in which rows of the grid structure each include descriptive snippets for one or more books. The first row, row 610, may be entirely devoted to the most relevant book ("The Murder Book"). As shown in this example, row 610 may include an image 615 for the book, such as a thumbnail image of the book's cover, the title of the book 620, information identifying the author of the book, a rating 625 of the book, a brief description 630 of the book, and a graphical box 635 including the price of the book and links 640 to buy the book or view a sample of the book. Selecting the link to buy the book may, for example, initiate an interaction through which the user may purchase the book. In some implementations, structures other than a grid structure, such as a list, may be used to present the search results.

The second row, row 650, may include descriptive snippets for a number of books. Each descriptive snippet may include, as shown, a thumbnail image of the book's cover, the title of the book, the book's author, and the price of the book. Each descriptive snippet in row 650 is visually smaller and less prominently displayed than the descriptive snippet of the book shown in row 610. Additionally, each descriptive snippet in row 650 may present less information than the descriptive snippet in row 610 (e.g., a shorter description, no links 640 to directly buy the book or view a sample of the book, etc.).

Referring back to FIG. 5, when the highest ranked book is not determined to be more relevant, by at least a threshold amount, than the next highest ranked book (block 530—NO), process 500 may include transmitting search results to client 205 using a normal presentation of relevant books in which the highest ranked book may be presented first but may not otherwise be visually distinguished (block 550).

Figure 7:
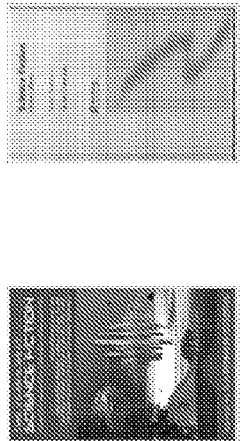

FIG. 7 is a diagram illustrating an example search results document 700 that may present the results of a book search query, such as book search results transmitted in block 550. In this example, assume that the search query is the query "science fiction books" and that no single book was determined by prominence detection component 420 to be relevant enough to be prominently presented.

As shown, search results document 700 may present the book search results in a grid structure in which rows of the grid structure each include descriptive snippets for one or more books. The first row, row 710, may include descriptive snippets for a number of books. Each descriptive snippet may include, as shown, a thumbnail image of the book's cover, the title of the book, information identifying the book's author, and the price of the book. The second row, row 720, may similarly include a number of descriptive snippets. Each descriptive snippet in rows 710 and 720 may generally be of equal visual prominence.

Figure 8:
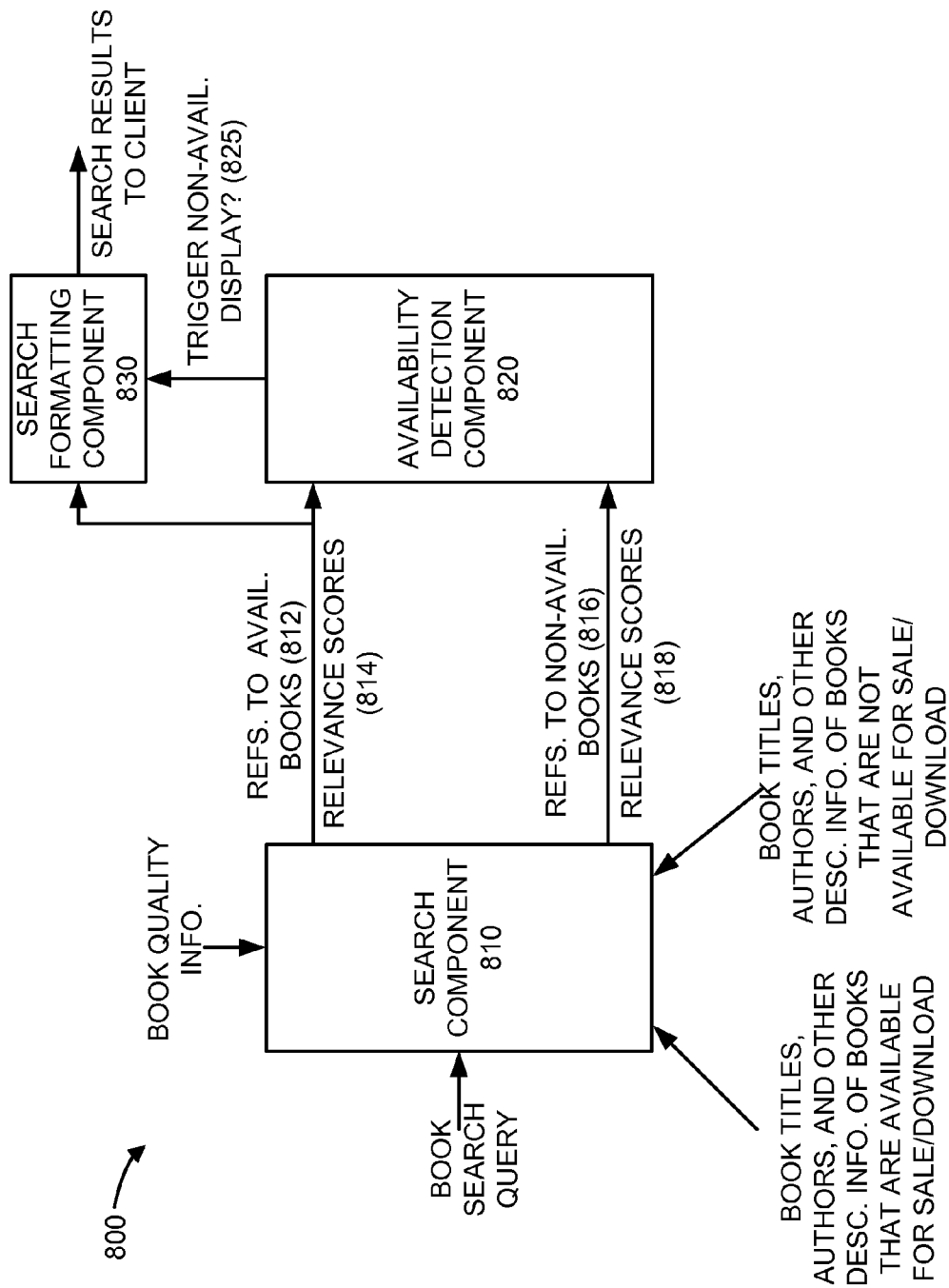
FIG. 8 is a diagram of example functional components relating to prominence detection and presentation of search results.

FIG. 8 is a diagram of example functional components 800 relating to prominence detection and presentation of search results. Functional components 800 may be implemented by a server, such as search server 210. In general, functional components 800 may determine whether a book search query is a search query for which the results should include an indication that the intended book is not available (e.g., not available for purchase or downloading in an online book store). The indication of the intended book, and the fact that the book is not currently available may be prominently presented to the user.

As shown in FIG. 8, functional components 800 may include a search component 810, an availability detection component 820, and a search formatting component 830.

Search component 810 may receive a search query from a client 205. In some implementations, the search query may be a query associated with a search for a book. Search component 810 may generally be implemented similarly to search component 410, except search component 810 may generate references to books corresponding to books that are relevant to the search query and available for download and/or purchase, and books that are relevant to the search query but are not available for download and/or purchase. The information relating to the available and unavailable books may be stored as two separate instances or indexes or stored as a single instance or index with a marker indicating whether each book is available or unavailable.

Search component 810 may use the search query to identify a set of references to available books relevant to the search query and a set of references to non-available books relevant to the search query. For example, search component 810 may analyze search terms, of the search query, against terms in an index to identify books, or references to books (812), that are available and that include or are associated with those search terms. For each identified book 812, search component 810 may generate a relevance score (814), which reflects a measure of relevance of the identified book to the search query. Search component 810 may also identify books, or references to books (816), that are not available (non-available) and that include or are associated with those search terms. For each identified book 816, search component 810 may generate a relevance score (818), which reflects a measure of relevance of the identified, non-available book to the search query. Many different techniques exist for measuring the relevance of a document (i.e., a book or descriptive information corresponding to a book) to a search query. Some example techniques have been described above.

The index or relevance determining technique used by search component 810 may be derived from or based on a number of sources of information, such as the sources of information described with respect to search component 410. For example, information relating to books, such as book titles, the authors of books, descriptive information relating to the books (e.g., a synopsis of the book), genre or other category information, or other information relating to books may be used by search component 810 to match book search queries to relevant books. This information may be received for both available and non-available books. Search component 810 may additionally use book quality information (for both available and non-available books) when matching book search queries to relevant books. As previously mentioned, book quality information may include, for example, a value or values relating to the authoritativeness or legitimacy of books.

In some implementations, the references to non-available books 816 and relevance scores 818, may include a single reference to the most relevant non-available book and the corresponding relevance score of the most relevant non-available book. In some implementations, the references to non-available books 816 and relevance scores 818 may include multiple references, corresponding to multiple books.

Availability detection component 820 may receive the references to the books (812 and 816) and the corresponding relevance scores (814 and 818) determined by search component 810. Based on this information, availability detection component 820 may determine whether the most relevant non-available book is the book that is being sought by the user.

In some implementations, availability detection component 820 may compare the relevance score of the most relevant available book and the relevance score of the most relevant non-available book when determining whether the most relevant non-available book is the book that is being sought by the user. For example, the ratio of the relevance scores of the most relevant available block and the most relevant non-available book may be calculated, and the determination made when the ratio is less than a particular threshold (e.g., 10). The particular threshold may be determined through, for example, empirical observation of a number of example search queries. In some implementations, instead of calculating the ratio of the relevance scores, the difference between the relevance scores of the most relevant non-available book and the most relevant available book may be calculated and compared to a threshold. Other techniques could alternatively be used to make the determination of whether the most relevant non-available book is the book that is likely being sought by the user. When this determination is made, availability detection component 820 may issue a trigger (825) indicating that the most relevant non-available book is the book that is, with a particular degree of certainty, being sought by the user.

Search formatting component 830 may receive the references to the relevant books 812 and relevance scores 814. Search formatting component 830 may also receive an indication of whether availability detection component 820 determined that the most relevant non-available book is the book that, with a particular degree of certainty, is being sought by the user. Search formatting component 830 may generate a search results document, such as a HTML document that includes the results of the book search query. The search results document may be formatted differently based on whether the most relevant non-available book is being sought by the user. For instance, when the most relevant non-available book is determined to be the book that is sought by the user, the most relevant non-available book may be prominently displayed with a message indicating that the book is not currently available in the book store. Otherwise, non-available books may not be presented to the user in the search results.

Although FIG. 8 shows an example of functional components 800, in other implementations, functional components 800 may contain fewer components, different components, differently arranged components, or additional components than those depicted in FIG. 8. Alternatively, or additionally, one or more functional components 800 may perform one or more other tasks described as being performed by one or more other functional components 800.

Figure 9:
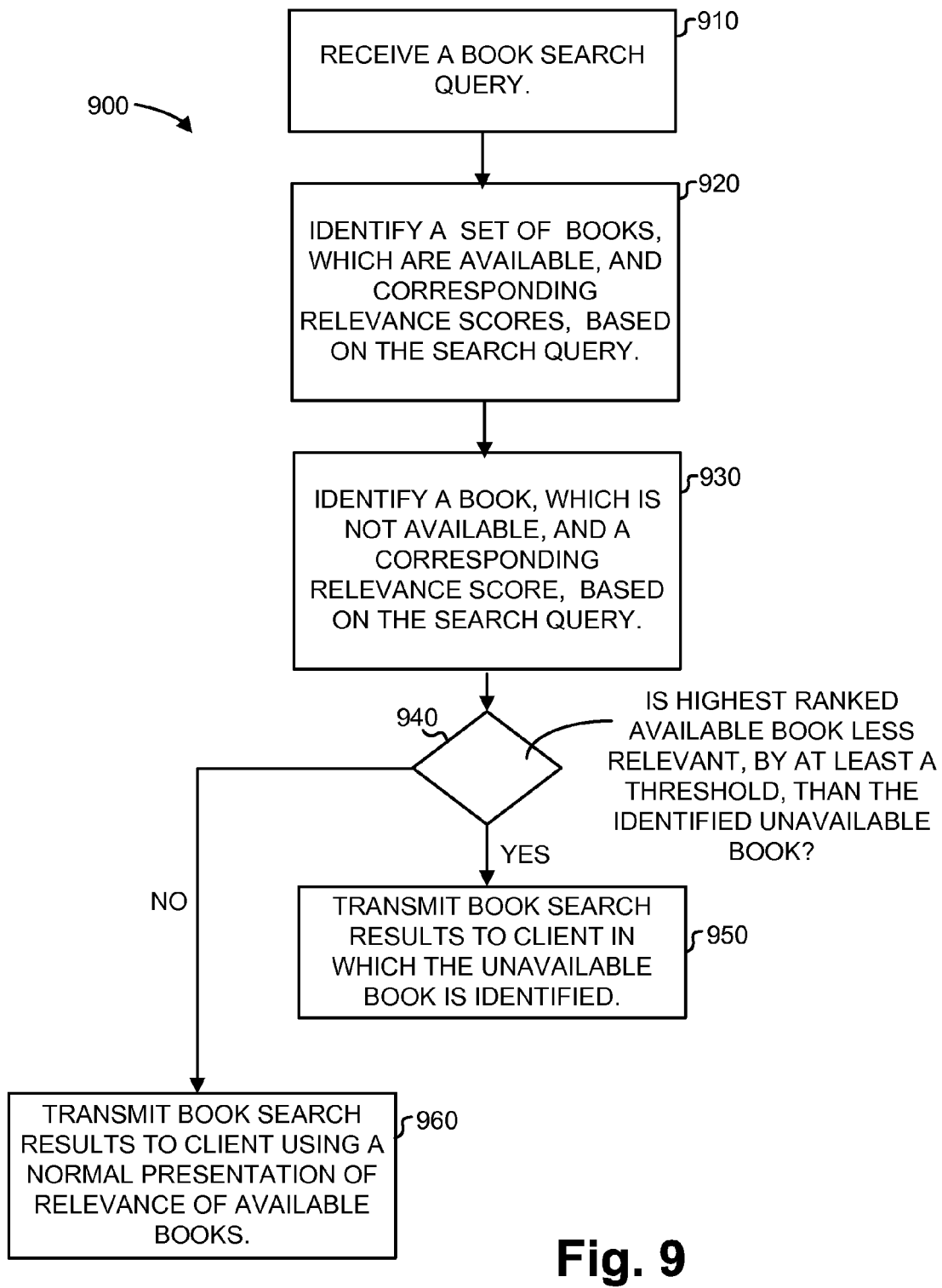
FIG. 9 is a flow chart of an example process for displaying selected results of book search queries.

FIG. 9 is a flow chart of an example process 900 for displaying selected results of book search queries. Process 900 may be performed, for example, by search server 210.

Process 900 may include receiving a book search query (block 910). For example, a user of a client 205 may desire to search for a book while accessing or visiting a book store, such as an online book store implemented by server 220.

Process 900 may further include identifying a set of books (or references to books), that are relevant to the search query and available for purchasing/downloading (block 920). For example, the identified books may be books available for purchase or download from an online book store. Relevance scores corresponding to the set of books may also be received (block 920). For instance, search component 910 may calculate, or otherwise determine, based on the search query, relevance scores associated with each of the books. Search component 810 may then determine a set of references to relevant books (e.g., references to the 100 books most relevant to the search query).

Process 900 may further include identifying a non-available book (or a reference to the book) that is relevant to the search query (block 930). For example, the identified book may be a book that is not available for purchase or download from the online book store. A relevance score corresponding to the book may also be obtained (block 930). The identified non-available book may be the highest ranked non-available book.

Process 900 may further include determining whether the highest ranked available book is less relevant, by at least a threshold value, than the identified unavailable book (block 940). As previously discussed, this determination may be made by availability detection component 820 and may be based on a comparison of the ratio, or the difference, of the relevance scores of the highest ranking available book and the identified non-available book, to a threshold value.

When the highest rank available book is determined to be less relevant, by at least a threshold value, than the identified non-available book (block 940—YES), process 900 may include transmitting search results, to client 205, in which the identified non-available book is included (block 950). In some implementations, the identified non-available book may be prominently presented relative to the available books.

When the highest rank available book is determined to not be less relevant, by at least a threshold value, than the identified non-available book (block 940—NO), process 900 may include transmitting search results to client 205 in which the identified non-available book is not included (e.g., a "normal" presentation of search results) (block 960). The available books may, for instance, be provided to client 205 in which descriptive snippets are arranged in a grid structure (or other structure) for the available books, such as is shown in search results document 700 (FIG. 7).

FIG. 10 is a diagram illustrating an example search results document 1000 that may present the results of a book search query, such as book search results transmitted in block 950. In this example, assume that the search query is the query "harry potter and the deathly hallows," and that availability detection component 820 determines that the non-available book "Harry Potter and the Deathly Hollows," by J. K. Rowling, is likely, with a degree of certainty, to be the book in which the user is interested.

As shown, search results document 1000 may present the book search results in a grid structure in which rows of the grid structure each include descriptive snippets to one or more books. The first row, row 1010, may be entirely devoted to the most relevant, but non-available, book ("Harry Potter and the Deathly Hallows"). As shown in this example, row 1010 may include an image 1015 for the book, such as a thumbnail image of the book's cover, name of the author, date of the book, number of pages in the book, the title of the book 1020, a brief description 1030 of the book, and a graphical box 1040 informing the client that the particular book is not available.

The second row, row 1050, may include descriptive snippets for a number of books that are available. Each descriptive snippet may include, as shown, a thumbnail image of the book's cover, information identifying the title of the book, the book's author, and the price of the book. Additionally, each descriptive snippet in row 1050 may present less information than the descriptive snippet in row 1010 (e.g., a shorter description, no links 640 to directly buy the book or view a sample of the book, etc.).

Figure 11:
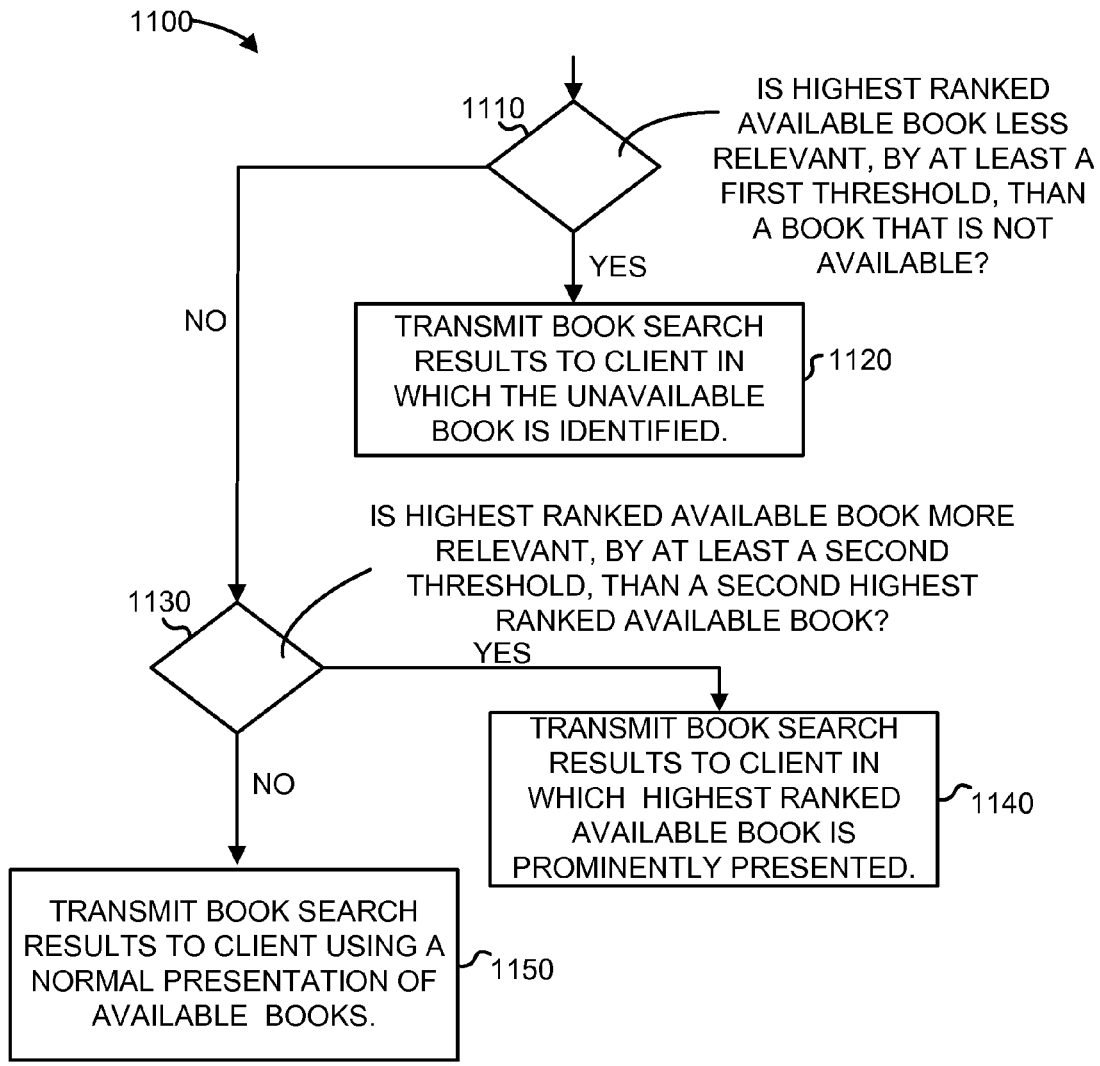
FIG. 11 is a flow chart of an example process for presenting selected search results.

FIG. 11 is a flow chart of an example process 1100 for presenting selected search results. Process 1100 may be performed by search server 210. Process 1100 may generally represent a combination of the processes discussed with respect to processes 500 and 900.

Process 1100 may be performed in response to receipt of a book search query, identification of a set available books and corresponding relevance scores, and identification of non-available book and the corresponding relevance score, as performed, for instance, in blocks 910, 920, and 930 (not shown in FIG. 11).

Process 1100 may include determining whether the highest ranked available book is less relevant, by at least a first threshold value, than the non-available book (block 1110). When the highest ranked available book is determined to be less relevant, by at least the first threshold value, than the non-available book (block 1110—YES), search results may be transmitted, to client 205, in which the unavailable book is identified (block 1120). The search results may be presented in a search results document similar to search results document 1000.

When the highest ranked available book is not determined to be less relevant, by at least the first threshold value, than the non-available book, (block 1110—NO), process 1100 may include determining whether the highest ranking available book is more relevant, by at least a second threshold value, than the second highest ranking available book (block 1130). When the result of this determination is true (block 1130—YES), process 1100 may include transmitting the book search results to client 205, in which the highest ranking book is prominently presented (block 1140). The search results, corresponding to block 1140, may be presented in a search results document similar to search results document 600. When, however, the highest ranking available book is not determined to be more relevant, by at least the second threshold value, than the second highest rank available book (block 1130—NO), process 1100 may include transmitting book search results, to client 205, using a normal presentation of the available books (block 1150). The search results, corresponding to block 1150, may be presented in a search results document similar to search results document 700.

As described above, search results for book search queries may be presented differently when the search query is one for which a book is identified that is likely, with a particular degree of certainty, to correspond to a particular book being sought by the search query. The particular book may be prominently presented in a search results document provided to the client.

The foregoing description provides illustration and description, but is not intended to be exhaustive or to limit the implementations to the precise form disclosed. Modifications and variations are possible in light of the above disclosure or may be acquired from practice of these implementations.

For example, while series of blocks have been described with regard to FIGS. 5, 9, and 11, the order of the blocks may be modified in other implementations. Further, non-dependent blocks may be performed in parallel. In addition, other blocks may be provided, or blocks may be eliminated, from the described flow charts, and other components may be added to, or removed from, the described systems.

It will be apparent that aspects described herein may be implemented in many different forms of software, firmware, and hardware in the implementations illustrated in the figures. The actual software code or specialized control hardware used to implement aspects does not limit the implementations. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the disclosed implementations unless explicitly described as such. Also, as used herein, the article "a" is intended to include one or more items and may be used interchangeably with "one or more." Where only one item is intended, the term "one" or similar language is used. Further, the phrase "based on" is intended if to mean "based, at least in part, on" unless explicitly stated otherwise.

What is claimed is:

1. A method performed by one or more server devices, the method comprising:
   receiving, by at least one of the one or more server devices and from a client, a search query associated with a search for books associated with a book repository;
   identifying, by at least one of the one or more server devices, a plurality of books that are relevant to the search query,
      the plurality of books being associated with relevance scores that represent a relevance of the plurality of books to the search query and that are based on book quality information that is independent of the search query;
   determining, by at least one of the one or more server devices, that a reference to a first book, of the plurality of books, should be prominently presented in a search results document, that includes references to the plurality of books, provided to the client, based on a relationship between a highest one of the relevance scores, associated with the first book and a second highest one of the relevance scores associated with a second book of the plurality of books.
      the references to the plurality of books including the reference to the first book and two or more other references to two or more other books of the plurality of books, and
      the two or more other books including the second book;
   formatting, by at least one of the one or more server devices and based on determining that the reference to the first book should be prominently presented in the search results document, the search results document to include the reference to the first book in a first row and the two or more other references to the two or more other books in a second row; and
   transmitting, by at least one of the one or more server devices, the search results document to the client.

2. The method of claim 1, where determining that the reference to the first book should be prominently presented includes:
   determining to prominently present the reference to the first book in the search results document provided to the client when a ratio, of the highest one of the relevance scores and the second highest one of the relevance scores, is greater than a particular threshold value.

3. The method of claim 1, where determining that the reference to the first book should be prominently presented includes:
   determining to prominently present the reference to the first book in the search results document provided to the client when the highest one of the relevance scores is greater than the second highest one of the relevance scores by a particular threshold.

4. The method of claim 1, where formatting the search results document includes:
   formatting the search results document to present the references to the plurality of books in a grid structure,
      the grid structure including the first row and the second row.

5. The method of claim 1, where the first row further includes a link to purchase the first book.

6. The method of claim 1,
   where the plurality of books are available, for download or purchase, by the client, and
   where the method further includes:
      identifying at least one other book, from a set of books that are not available for download or purchase by the client, that is relevant to the search query,
         the at least one other book being associated with a relevance score that represents a relevance of the at least one other book to the search query;
      comparing the relevance score, associated with the first book, with the relevance score of the at least one other book, to determine whether to include a reference to the at least one other book in the search results document provided to the client; and
      formatting the search results document to prominently present the reference to the at least one other book when a result of the comparison, of the relevance score of the first book with the relevance score of the at least one other book, indicates that the reference to the at least one other book is to be included in the search results document provided to the client.

7. The method of claim 6, where formatting the search results document to prominently present the reference to the at least one other book includes:
   including a message, indicating that the at least one other book is not available for download or purchase, in the search results document.

8. The method of claim 1, where the relevance scores, associated with the plurality of books, are based on one or more of whether the plurality of books are published by a particular set of publishing companies, whether the plurality of books are on best selling lists, whether the plurality of books are written by a particular set of authors, or whether the plurality of books have sales volumes greater than a threshold.

9. The method of claim 1, where the plurality of books include printed books, electronic books, magazines, electronic magazines, or newspapers.

10. The method of claim 1, where formatting the search results document includes:
    formatting the search results document to include more information in the reference to the first book than in the two or more other references to the two or more other books of the plurality of books.

11. A computer-readable medium storing instructions, the instructions comprising:
    a plurality of instructions that, when executed by at least one processor, cause the at least one processor to:
    receive, from a client, a search query for books;
    identify a plurality of books that are relevant to the search query,
       the plurality of books being associated with relevance scores that represent a relevance of the plurality of books to the search query and that are based on book quality information that is independent of the search query;
    determine that a reference to a first book, of the plurality of books, should be prominently presented in a search results document, that includes references to the plurality of books, provided to the client, based on a relationship between a highest one of the relevance scores, associated with the first book, and a second highest one of the relevance scores associated with a second book of the plurality of books, the references to the plurality of books including the reference to the first book and two or more other references to two or more other books of the plurality of books, and the two or more other books including the second book;

format, based on determining that the reference to the first book should be prominently presented in the search results document, the search results document to cause the reference to the first book to be prominently presented in relation to a manner in which the two or more other references to the two or more of books are presented; and transmit the search results document to the client.

12. The computer-readable medium of claim 11, where the instructions further comprise:

one or more instructions to determine to prominently present the reference to the first book in the search results document provided to the client when a ratio, of the highest one of the relevance scores and the second highest one of the relevance scores, is greater than a particular threshold value.

13. The computer-readable medium of claim 11, where the instructions further comprise:

one or more instructions to determine to prominently present the reference to the first book in the search results document provided to the client when the highest one of the relevance scores is greater than the second highest one of the relevance scores by a particular threshold.

14. The computer-readable medium of claim 11, where the plurality of books are available, for download or purchase by the client, and where the instructions further comprise one or more instructions to:

identify at least one other book, from a set of books that are not available for download or purchase by the client, that is relevant to the search query, the at least one other book being associated with a relevance score that represents a relevance of the at least one other book to the search query;

compare the highest one of the relevance scores, associated with the first book, with the relevance score of the at least one other book to determine whether to include a reference to the at least one other book in the search results document provided to the client, and format the search results document to prominently present the at least one other book when a result of the comparison, of the highest one of the relevance scores with the relevance score of the at least one other book, indicates that the reference to the at least one other book is to be included in the search results document provided to the client.

15. A method performed by one or more server devices, the method comprising:

receiving, by at least one of the one or more server devices and from a client, a search query associated with a search for books;

identifying, by at least one of the one or more server devices, a plurality of books that are relevant to the search query, the plurality of books being associated with relevance scores that represent a relevance of the plurality of books to the search query, and the plurality of books being available for download or purchase by the client;

identifying at least one other book from a set of books that are not available for download or purchase by the client, the at least one other book being associated with a relevance score that represents a relevance of the at least one other book to the search query;

determining, by at least one of the one or more server devices, to prominently present a reference to the at least one other book in a search results document provided to the client based on a relationship between a highest one of the relevance scores, associated with a first book of the plurality of books, and the relevance score of the at least one other book;

formatting, by at least one of the one or more server devices and based on determining to prominently present the reference to the at least one other book in the search results document, the search results document to cause the reference to the at least one other book to be prominently presented in relation to a manner in which two or more references to two or more books, of the plurality of books, are presented, the two or more books including the first book; and transmitting, by at least one of the one or more server devices, the search results document to the client.

16. The method of claim 15, where formatting the search results document includes:

providing, in connection with the reference to the at least one other book within the search results document, a message indicating that the at least one other book is not available for download.

17. The method of claim 15, further comprising:

comparing the relevance score of the first book with a relevance score of a second book, of the two or more books, associated with a second highest one of the relevance scores of the plurality of books; and formatting the search results document to prominently present a reference to the first book in relation to references to other ones of the plurality of books when a result of the comparison indicates that the relevance of the first book is greater than the relevance of the second book, by at least a threshold and when the determination indicates that the at least one other book should not be prominently presented in the search results document provided to the client.

18. The method of claim 17, where generating formatting the search results document to prominently present the reference to the first book includes:

formatting the search results document to present a plurality of references to the plurality of books in a grid structure, the plurality of references including the reference to the first book and and the references to the other ones of the plurality of books.

19. The method of claim 18, where the grid structure includes a link to purchase the first book.

20. A computer-readable medium storing instructions, the instructions comprising:

a plurality of instructions that, when executed by at least one processor, cause the at least one processor to:

receive, from a client, a search query for books;

identify a plurality of books that are relevant to the search query, the plurality of books being associated with relevance scores that represent a relevance of the plurality of books to the search query, and the plurality of books including books that are available for download or purchase by the client;

identify at least one other book, from a set of books that are not available for download or purchase by the client,
the at least one other book being associated with a relevance score that represents a relevance of the at least one other book to the search query;

determine to prominently present a reference to the at least one other book in a search results document provided to the client based on a relationship between a highest one of the relevance scores, associated with a first book of the plurality of books, and the relevance score of the at least one other book format, based on determining to prominently present the reference to the at least one other book in the search results document, the search results document to cause the reference to the at least one other book to be prominently presented in relation to a manner in which two or more references to two or more books, of the plurality of books, are presented,
the two or more books including the first book; and transmit the search results document to the client.

21. The computer-readable medium of claim 20, where the instructions further include one or more instructions to:
provide, in connection with the reference to the at least one other book within the search results document, a message indicating that the at least one other book is not available for download or purchase.

22. The computer-readable medium of claim 20,
where the instructions further include one or more instructions to:
compare the relevance score of the first book with a relevance score of a second book, of the two or more books, associated with a second highest one of the relevance scores of the plurality of books; and
format the search results document to prominently present a reference to the first book in relation to references to other ones of the plurality of books when a result of the comparing of the relevance score of the first book indicates that the relevance score of the first book is greater than the relevance score of the second book, by at least a threshold and when the determination indicates that the at least one other book should not be prominently presented in the search results document provided to the client, and
where the two or more references including the reference to the first book.

23. The computer-readable medium of claim 22, where one or more instructions, of the plurality of instructions, to format the search results document to prominently present the reference to the first book, include one or more instructions to:
format the search results document to present references to the plurality of books in a grid structure,
the grid structure including:
a first row that presents the reference to the first book, and
a second row that presents the references to the other ones of the plurality of books.

* * * * *